(12) United States Patent
Zhang

(10) Patent No.: US 10,007,529 B2
(45) Date of Patent: Jun. 26, 2018

(54) DATA TERMINAL RUNNING MODE SWITCHING METHOD, DEVICE, AND DATA TERMINAL

(71) Applicant: ZTE CORPORATION, Shenzhen, Guangdong Province (CN)

(72) Inventor: Yabing Zhang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 127 days.

(21) Appl. No.: 14/399,017

(22) PCT Filed: Jul. 12, 2013

(86) PCT No.: PCT/CN2013/079294
§ 371 (c)(1),
(2) Date: Nov. 5, 2014

(87) PCT Pub. No.: WO2013/182123
PCT Pub. Date: Dec. 12, 2013

(65) Prior Publication Data
US 2015/0134944 A1    May 14, 2015

(30) Foreign Application Priority Data
Oct. 9, 2012    (CN) .......................... 2012 1 0378646

(51) Int. Cl.
*G06F 9/44* (2018.01)
*G06F 9/445* (2018.01)
*G06F 9/4401* (2018.01)

(52) U.S. Cl.
CPC ............ *G06F 9/441* (2013.01); *G06F 9/4401* (2013.01); *G06F 9/4415* (2013.01); *G06F 9/44505* (2013.01)

(58) Field of Classification Search
CPC ...... G06F 9/4401; G06F 9/441; G06F 9/4415; G06F 9/44505
See application file for complete search history.

(56) References Cited

U.S. PATENT DOCUMENTS

| | | | |
|---|---|---|---|
| 2010/0102238 A1* | 4/2010 | Kanazawa | ............ G01J 3/0254 |
| | | | 250/363.01 |
| 2010/0225640 A1 | 9/2010 | Vieri et al. | |
| | (Continued) | | |

FOREIGN PATENT DOCUMENTS

| | | |
|---|---|---|
| CN | 1538349 A | 10/2004 |
| CN | 102566884 A | 7/2012 |
| | (Continued) | |

OTHER PUBLICATIONS

International Search Report, dated Oct. 24, 2013, 2 pages.
European Search Report for European Patent Application No. 13800158, completed May 22, 2015, 3 pages.

*Primary Examiner* — Terrell S Johnson
(74) *Attorney, Agent, or Firm* — Ling Wu; Stephen Yang; Ling and Yang Intellectual Property

(57) ABSTRACT

A data card running mode switching method is disclosed. The data card booting into a first running mode, the data card judging whether the first running mode matches with a type of an operating system running on a computer or not, if not, the data card switching to a second running mode that matches with the type of the operating system running on the computer, and running under the second running mode. Embodiments of the present document solve the problems of incompatibility and nonsupport between a running mode of a data card and an operating system running on a computer.

11 Claims, 2 Drawing Sheets

(56) References Cited

U.S. PATENT DOCUMENTS

| 2012/0054372 | A1 | 3/2012 | Chen | |
|---|---|---|---|---|
| 2012/0054384 | A1* | 3/2012 | Zhang | G06F 13/387 710/62 |
| 2012/0102238 | A1* | 4/2012 | Wei | G06F 9/4415 710/13 |
| 2012/0173861 | A1* | 7/2012 | Ou | G06F 9/4408 713/2 |
| 2015/0134944 | A1* | 5/2015 | Zhang | G06F 9/4401 713/2 |

FOREIGN PATENT DOCUMENTS

| CN | 103123594 A | 5/2013 |
|---|---|---|
| EP | 2423825 A1 | 2/2012 |
| EP | 2439648 A1 | 4/2012 |
| WO | WO2004046942 A1 | 6/2004 |

\* cited by examiner

DATA TERMINAL RUNNING MODE SWITCHING METHOD, DEVICE, AND DATA TERMINAL

TECHNICAL FIELD

The present document relates to the field of communication technologies, and more particularly, to a data terminal running mode switching method, a device and a data terminal.

BACKGROUND

Currently, operating systems running on many computers support the Remote Network Driver Interface Specification (RNDIS) driver by default. In order to allow users easy to use, some data cards can support the RNDIS driver, so that the users can directly access to the network without installing the driver. In this case, however, the interface can not be provided to the user, and in order to solve this problem, the data card must boot in the router mode, and under said router mode, an operating interface is provided to the users via the Web interface so as to facilitate the users.

With the continuous upgrading of the operating system running on the computer, the new operating system that is now emerging, such as the windows 8, supports both the RNDIS driver and the Mobile Broadband Interface Model Specification (MBIM) driver. Supporting the RNDIS driver can actually support free-driver function, but in fact, many operators require to support the MBIM driver in the operating system windows 8, and supporting processing the MBIM message requires to run under the USB Tethering mode, however, currently most of the data cards boot into the driver under the router mode, which causes the problem that the operating system such as the windows 8 running on the computer does not support the running mode of the data card.

SUMMARY

The embodiments of the present document provide a data terminal running mode switching method, a device and a data terminal, to solve the problem of incompatibility and nonsupport between a running mode of a data card and an operating system running on a computer.

Based on the abovementioned problem, the embodiment of the present document provides a data terminal running mode switching method, comprising: a data terminal booting in a first running mode; said data terminal judging whether said first running mode matches with a type of an operating system running on a computer or not, if said first running mode matches with the type of said operating system running on said computer, said data terminal continuing to run normally under said first running mode; if said first running mode does not match with the type of said operating system running on said computer, said data terminal switching to a second running mode that matches with the type of said operating system running on said computer, and running under said second running mode.

Alternatively, the step of said data terminal booting into said first running mode comprises:

said data terminal reading a recorded identifier of said last-run first running mode from a file saved in itself during an initialization process;

said data terminal starting an initialization routine of said first running mode according to said read-out identifier of said first running mode.

Alternatively, after said data terminal boots into said first running mode, before judge whether said first running mode matches with the type of said operating system running on said computer or not, said method further comprises:

said data terminal reading relevant information sent by said computer, and determining the type of said operating system running on said computer according to said read-out relevant information.

Alternatively, the step of said data terminal switching to a second running mode that matches with the type of said operating system running on said computer comprises:

said data terminal changing the identifier of said first running mode that is recorded in a file saved in itself into an identifier of said second running mode;

said data terminal rebooting into said second running mode according to the identifier of said second running mode after the change.

Alternatively, said first running mode is a USB tethering mode, said second running mode is a router mode; alternatively, said first running mode is a router mode, said second running mode is a USB tethering mode. The embodiment of the present document provides a data terminal running mode switching device, comprising: a booting module, set to boot into a first running mode; a judging module, set to judge whether said first running mode matches with the type of said operating system running on said computer or not after said booting module boots into said first running mode; a running module, set to continue running normally under said first running mode when said judging module judges out that they match, and switch, when said judging module judges out that they do not match, to a second running mode that matches to the type of said operating system running on said computer and run under said second running mode.

Alternatively, said booting module booting into said first running mode refers to that said booting module reads the recorded identifier of said first running mode running last time from the file saved in said data terminal during an initialization process, and starts up the initialization routine of said first running mode according to the read-out identifier of said first running mode.

Alternatively, the abovementioned device further comprises: a reading module, set to read relevant information sent by said computer, and determine the type of said operating system running on said computer according to the read-out relevant information.

Alternatively, the step of said running module switching to a second running mode that matches with the type of said operating system running on said computer refers to: said running module changing the identifier of said first running mode that is recorded in the file of said data terminal into the identifier of said second running mode; rebooting into said second running mode based on the identifier of said second running mode after the change.

The embodiment of the present document further provides a data terminal, and said data terminal comprises the abovementioned data terminal running mode switching device provided in the embodiment of the present document.

Advantageous Effects of the embodiment of the present document comprise:

the embodiment of the present document provides a data terminal running mode switching method, a device and a data terminal, where after said data terminal boots into said first running mode, it judges whether said first running mode matches with the type of said operating system running on said computer or not, if yes, said data terminal continues to run normally under the first running mode; if no, said data terminal switches to the second running mode that matches to the operating system running on said computer, and runs under the second running mode. In the embodiment of the present document, regardless whether the operating system running on said computer is a conventional operating system or a new operating system, the data terminal can switch its own running mode to a running mode that matches with the type of the running operating system, and normally run in this running mode. For example, when the running operating system is Windows 8, its running mode is the USB tethering mode, then the technical scheme of the data terminal running mode switching method, the device and the data terminal provided in the embodiment of the present document can achieve switching to a running mode that is compatible with Windows 8. The embodiment of the present document solves the problem of incompatibility and nonsupport between the running mode of the data card and the operating system running on the computer.

PREFERRED EMBODIMENTS OF THE PRESENT DOCUMENT

Hereinafter with reference to the accompanying drawings, the embodiments of the present document will be described in detail. It should be noted that, in the case of no conflict, the embodiments and features in the embodiment of the present application may be arbitrarily combined with each other.

Figure 1:
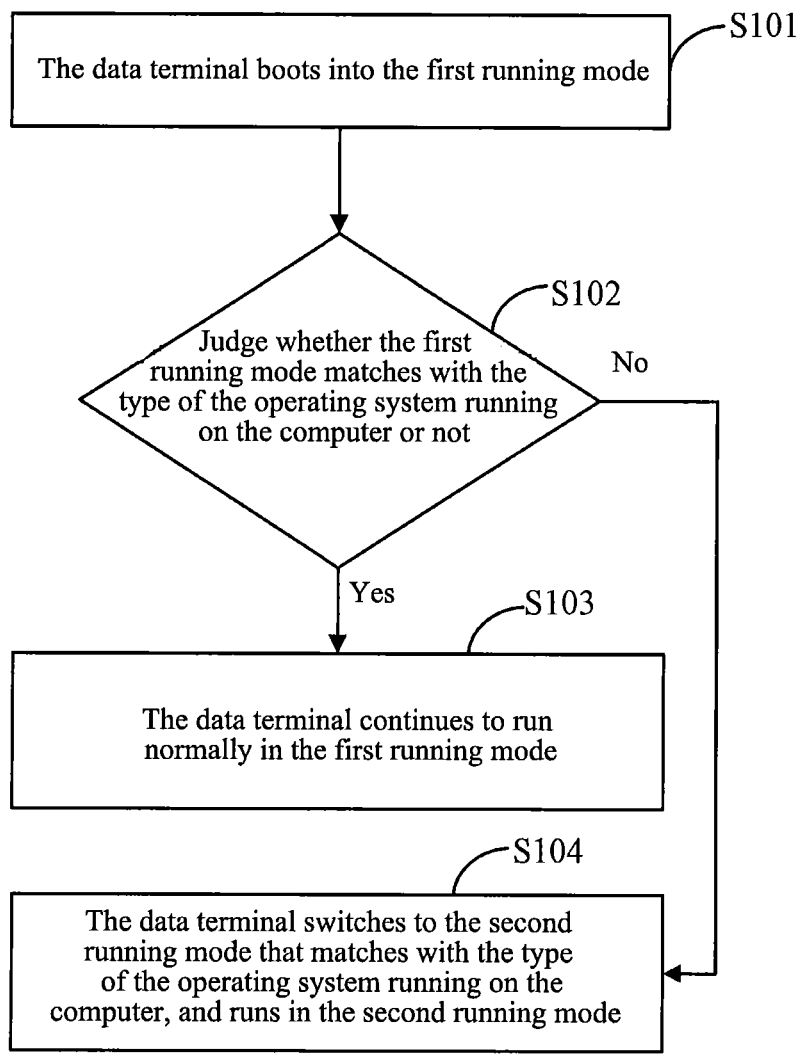
FIG. 1 is a first flow chart of a data terminal running mode switching method provided in an embodiment of the present document.

The embodiment of the present document provides a data terminal running mode switching method, as shown in FIG. 1, specifically comprising the following steps:

S101: the data terminal boots into the first running mode;

S102: the data terminal judges whether the first running mode matches with the type of the operating system running on the computer or not, if the first running mode matches with the type of the operating system running on the computer, proceed to step S103; if the first running mode does not match with the type of the operating system running on the computer, proceed to step S104;

S103: the data terminal continues to run normally in the first running mode;

S104: the data terminal switches to the second running mode that matches with the type of the operating system running on the computer, and runs in the second running mode.

In the embodiments of the present document, said second running mode and said first running mode are two different running modes, the compatibility of the operating system running on said computer is different for different running modes, for example, WindowsXP usually runs in the router mode, and Windows 8 usually runs in the USB tethering mode, for example, the USB tethering mode may comprise the modem mode, and may also comprise other modes, which are not enumerated here. In the embodiment of the present document, the first running mode of said data terminal such as the data card is the USB tethering mode, said second running mode is the router mode, the data card can operate under these two different modes; alternatively, in reverse, said first running mode is the router mode, and said second running mode is the USB tethering mode. Of course, said first running mode and said second running mode may be other different modes supported by the card data, and the embodiment of the present document is not limited to the abovementioned two running modes.

Alternatively, for step S101, it can be achieved with the following process:

the data terminal reading the recorded identifier of said first running mode (that is the running mode that runs last time) from the file saved in itself during the initialization process;

according to the read-out identifier of said first running mode, said data terminal starts up the initialization routine of said first running mode. For example, if the identifier of the first running mode that runs normally last time is an identifier of the USB tethering mode, the data terminal starts up the initialization routine of the USB tethering mode according to this identifier. If the identifier of the first running mode that runs normally last time is an identifier of the router mode, then start up the initialization routine of the router mode according to this identifier.

Alternatively, after implementing the step S101 and before implementing the step S103, said data terminal may further perform the following step:

the data terminal reads the relevant information sent by the computer, and determines the type of the operating system running on the computer according to the relevant information.

In this step, according to the type of the operating system currently running on the computer, the computer further selects to send different relevant information, for example, when the operating system running on the computer is Window7, the computer sends the data terminal the relevant information which is different from the relevant information sent when the running operating system is Window8, and the content of the specific relevant information is the prior art, and is not discussed here.

Alternatively, in step S101, the data terminal switches to the second running mode in the following manner:

said data terminal changing the identifier of the first running mode that is recorded in a file saved in itself to the identifier of said second running mode;

according to the identifier of the second running mode after the change, the data terminal rebooting into said second running mode.

In the embodiment of the present document, the above-mentioned method can be applied to various terminal devices, and for example, it can be applied to the data card.

In the following, by taking the data card as the executive agent for example, the data terminal running mode switching method will be described in detail.

Figure 2:
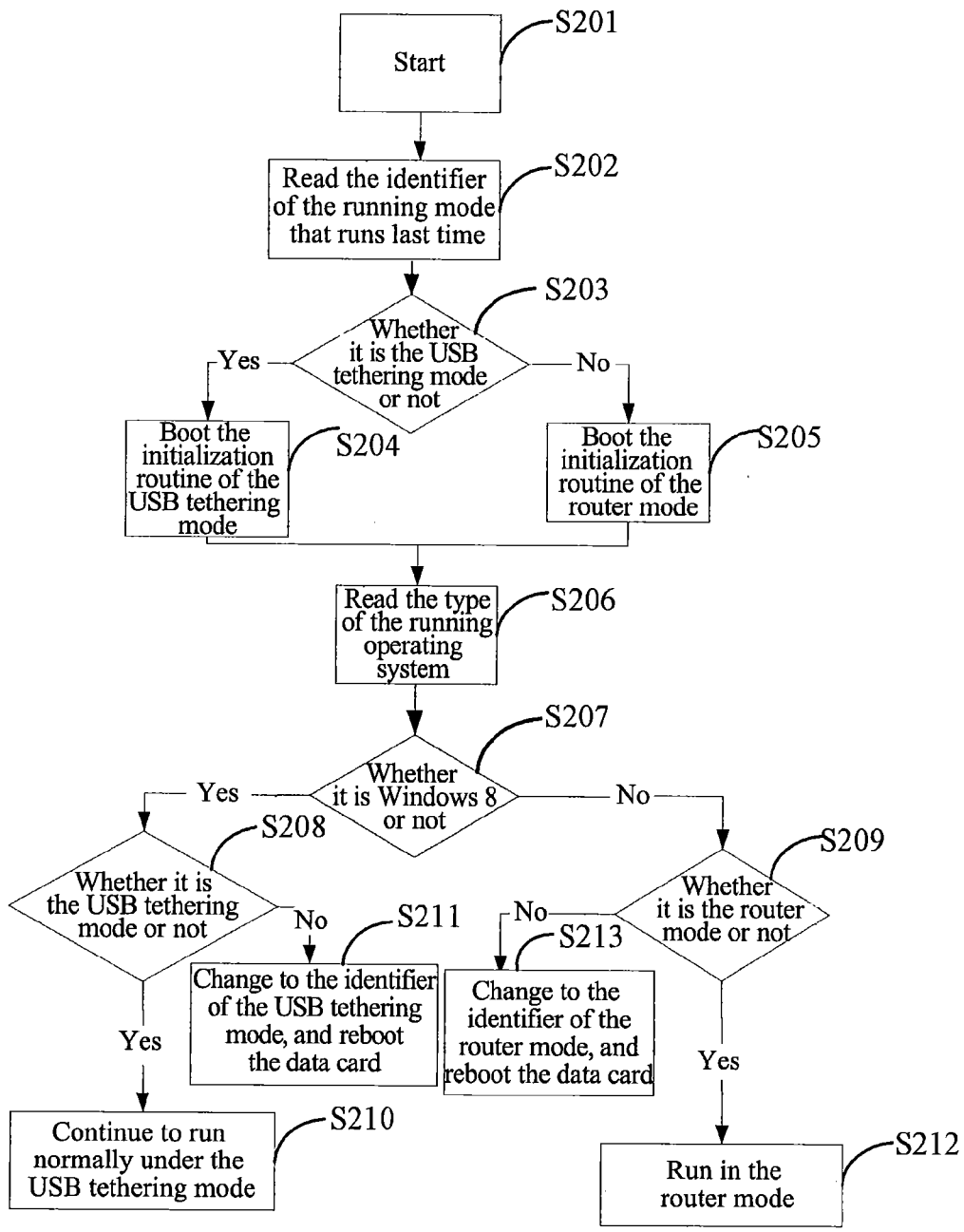
FIG. 2 is a second flow chart of a data terminal running mode switching method provided in an embodiment of the present document.

Suppose for each operating system running on the computer, in the case that it can cannot run in the USB tethering mode, it means that it can run in the router mode, as shown in FIG. 2, the process is as follows:

S201: start to boot

S202: read the identifier of the running mode that runs normally last time from the file saved in the data card during the initialization process;

S203: the data card judges whether the running mode is the USB tethering mode or not based on the read-out identifier, if it is the USB tethering mode, proceed to step S204, if it is not the USB tethering mode, proceed to step S205;

S204: the data card boots the initialization routine of the USB tethering mode;

S205: the data card boots the initialization routine of the router mode;

S206: after the booting, the data card reads the relevant information sent by the computer, and determines the type of the operating system running on the computer according to said relevant information;

S207: the data card judges whether the type of the operating system running on the computer that sends the relevant information is a type of Windows 8 or not, if yes, proceed to step S208, if no, proceed to step S209;

S208: the data card continues to judge whether it runs in the USB tethering mode or not, if it runs in the USB tethering mode, proceed to step S210, if it does not run in the USB tethering mode, proceed to step S211;

S209: the data card continues to judge whether it runs in the router mode or not, if it runs in the router mode, proceed to step S212, if it does not run in the router mode and does not match with the type of the operating system running on the computer, proceed to step S213;

S210: the data card continues to run normally under the USB tethering mode;

S211: the data card changes the identifier of the router mode to the identifier of the USB tethering mode, and reboots the data card;

S212: the data card runs in the router mode;

S213: the data card changes the identifier of the USB tethering mode to the identifier of the router mode, and reboots the data card.

For the users, after the data card reboots, the running mode of said data card can match with the type of the operating system that runs on the computer, then it can access to the Internet normally.

The embodiment of the present document further provides a data terminal running mode switching device and a data terminal, since the principle of said device and said apparatus solving problems is similar to said data terminal running mode switching method, the implementation of said device and apparatus can refer to the implementation of the aforementioned method, and the duplication is not repeated here.

Figure 3:
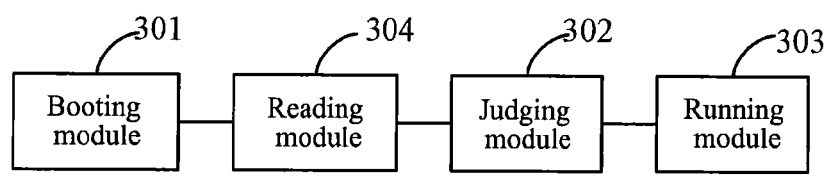
FIG. 3 is a structural diagram of a data terminal running mode switching device provided in an embodiment the present document.

The embodiment of the present document provides a data terminal running mode switching device, as shown in FIG. 3, comprising:

booting module 301, set to boot into the first running mode;

judging module 302, set to after said booting module 301 boots into the first running mode, judge whether said first running mode matches with the type of said operating system running on said computer or not;

running module 303, set to continue to run normally under the first running mode when said judging module 302 determines that they match; and when said judging module 302 determines that they mismatch, switch to the second running mode that matches with the type of the operating system running on the computer, and run under the second running mode.

Alternatively, said booting module 301 booting into said first running mode refers to that said booting module 301 reads the recorded identifier of said first running mode that runs the last time from the file saved in itself during the initialization process, and according to the read-out identifier of said first running mode, starts up the initialization routine of said first running mode.

Alternatively, the abovementioned device may further comprise:

reading module 304, set to read the relevant information sent by the computer, and determine the type of the operating system running on the computer according to the relevant information.

Alternatively, said running module 303 switching to the second running mode that matches with the type of the operating system running on the computer refers to: said running module 303 changing the identifier of the first running mode recorded in the file of said data terminal to the identifier of said second running mode; according to the identifier of said second running mode after the change, rebooting into said second running mode.

The embodiment of the present document further provides a data terminal, comprising the abovementioned device, for example, said data terminal may be a data card, or a free-driver data card.

The embodiment of the present document provides a data terminal running mode switching method, a device and a data terminal, after said data terminal boots into the first running mode, it judges whether the first running mode matches with the type of the operating system running on the computer or not, when yes, said data terminal continues to run normally in the first running mode; if no, the data terminal switches to the second running mode that matches with the type of the operating system running on said computer, and runs under said second running mode. In the embodiment of the present document, regardless whether the operating system running on the computer is a conventional operating system or a new operating system, the data terminal may switch its own running mode to a running mode that matches with the type of the running operating system, and run normally in this running mode, for example, when the running operating system is Windows 8, its running mode is the USB tethering mode, then switching to a running mode compatible with Windows 8 can be achieved by the abovementioned method. The embodiment of the present document solves the problem of incompatibility and nonsupport between the running mode of the data card and the operating system running on the computer.

Those ordinarily skilled in the art can understand that all or some of steps of the abovementioned method may be completed by the programs instructing the relevant hardware, and said programs may be stored in a computer-readable storage medium, such as read only memory, magnetic or optical disk. Alternatively, all or some of the steps of the abovementioned embodiments may also be implemented by using one or more integrated circuits. Accordingly, each module/unit in the abovementioned embodiments may be realized in the form of hardware or software function modules. The embodiments of the present document are not limited to any specific form of hardware and software combinations.

The above embodiments are only used to illustrate but not intended to limit the technical scheme of the present document. A person skilled in the art should understand that various changes and equivalent replacements can be made for the technical scheme of the present application without departing from the spirit and scope of the technical scheme of the present application, and all these changes and equivalent replacements should be included within the scope of the claims of the present application.

INDUSTRIAL APPLICABILITY

The embodiment of the present document provides a data terminal running mode switching method, a device and a data terminal, where after said data terminal boots into said first running mode, it judges whether said first running mode matches with the type of said operating system running on said computer or not, if yes, said data terminal continues to run normally under the first running mode; if no, switches to the second running mode that matches to the operating system running on said computer, and runs under the second running mode. In the embodiment of the present document, regardless whether the operating system running on said computer is a conventional operating system or a new operating system, the data terminal can switch its own running mode to a running mode that matches with the type of the running operating system, and normally run in this running mode, for example, when the running operating system is Windows 8, its running mode is the USB tethering mode, then the technical scheme of the data terminal running mode switching method, the device and the data terminal provided in the embodiment of the present document can achieve switching to a running mode that is compatible with Windows 8. The embodiment of the present document solves the problem of incompatibility and nonsupport between the running mode of the data card and the operating system running on the computer.

I claim:

1. A data card running mode switching method, comprising:
a data card reading a recorded identifier of a first running mode that runs last time from a file saved in said data card during an initialization process, and said data card starting an initialization routine of said first running mode according to said read-out identifier of said first running mode;
after said data card boots into said first running mode, said data card judging whether said first running mode under which said data card currently runs matches with a type of an operating system running on a computer or not;
if said first running mode matches with the type of said operating system running on said computer, said data card continuing to run normally under said first running mode;
if said first running mode does not match with the type of said operating system running on said computer, said data card switching to and running under a second running mode of the data card that matches with the type of said operating system running on said computer.

2. The method of claim 1, wherein, after said data card boots into said first running mode, and before judging whether said first running mode matches with the type of said operating system running on said computer or not, said method further comprises:
said data card reading relevant information sent by said computer, and determining the type of said operating system running on said computer according to said read-out relevant information.

3. The method of claim 2, wherein, said first running mode is a USB tethering mode, said second running mode is a router mode; or, said first running mode is a router mode, said second running mode is said USB tethering mode.

4. The method of claim 1, wherein, the step of said data card switching to a second running mode that matches with the type of said operating system running on said computer comprises:
said data card changing the identifier of said first running mode that is recorded in a file saved in itself into an identifier of said second running mode;
said data card rebooting into said second running mode according to the identifier of said second running mode after the change.

5. The method of claim 4, wherein, said first running mode is a USB tethering mode, said second running mode is a router mode; or, said first running mode is a router mode, said second running mode is said USB tethering mode.

6. The method of claim 1, wherein, said first running mode is a USB tethering mode, said second running mode is a router mode; or, said first running mode is a router mode, said second running mode is said USB tethering mode.

7. A data card running mode switching device, comprising:
a booting module, set to read a recorded identifier of a first running mode running last time from a file saved in said data card during an initialization process, and start up an initialization routine of said first running mode according to the read-out identifier of said first running mode;
a judging module, set to judge, after said data card boots into said first running mode, whether said first running mode under which said data card currently runs matches with a type of an operating system running on a computer or not;
a running module, set to continue running normally under said first running mode when said judging module judges out that they match, and switch, when said judging module judges out that they do not match, to a second running mode that matches to the type of said operating system running on said computer and run under said second running mode.

8. The device of claim 7, further comprising:
a reading module, set to read relevant information sent by said computer, and determine the type of said operating system running on said computer according to the read-out relevant information.

9. The device of claim 7, wherein, the step of said running module switching to a second running mode that matches with the type of said operating system running on said computer refers to: said running module changing the identifier of said first running mode that is recorded in the file of said data card into the identifier of said second running mode; rebooting into said second running mode based on the identifier of said second running mode after the change.

10. A data card, and said data card comprising the device of claim 9.

11. A data card, and said data card comprising the device of claim 7.

* * * * *